UNITED STATES PATENT OFFICE.

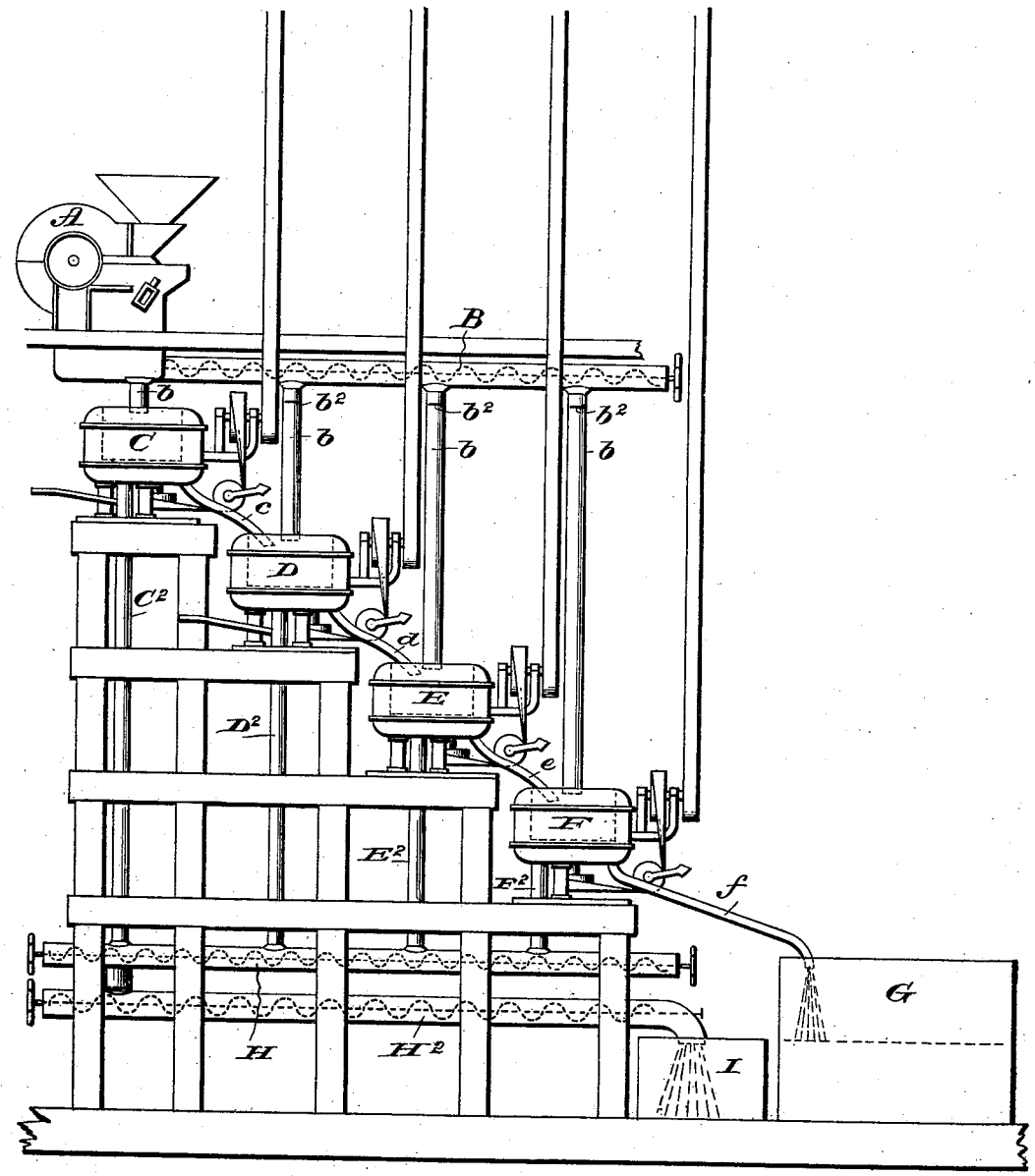

ELMER B. WILLIAMS, OF MEMPHIS, TENNESSEE, ASSIGNOR TO H. G. CONNOR, OF WILSON, NORTH CAROLINA.

DIFFUSION PROCESS.

SPECIFICATION forming part of Letters Patent No. 689,838, dated December 24, 1901.

Application filed November 9, 1898. Serial No. 695,965. (No specimens.)

*To all whom it may concern:*

Be it known that I, ELMER B. WILLIAMS, a citizen of the United States, residing at Memphis, in the county of Shelby and State of Tennessee, have invented certain new and useful Improvements in Diffusion Processes; and I do hereby declare the following to be a full, clear, and exact description of the invention, such as will enable others skilled in the art to which it appertains to make and use the same.

Sugar-cane contains generally about two hundred and twenty-five pounds of sugar to the ton, more or less, and of this amount it is only possible under the most judicious and careful handling and by the employment of the best machinery for the purpose to obtain from one hundred and sixty to one hundred and seventy-five pounds of sugar to the ton of cane, thus leaving from sixty-five to fifty pounds of sugar remaining in the minute interstices of the cellulose of the "bagasse," by which latter name the crushed product of cane is known.

It is the object of this invention in a simple, effective, and comparatively inexpensive manner to extract from this bagasse—a product heretofore practically worthless from a commercial standpoint—the sugar that remains after the juice has been expressed from the whole cane by the ordinary mills in common use and with the bagasse remaining after this second treatment to present a marketable product, which shall have a value greatly in excess of that of the ordinary bagasse.

In the ordinary procedure of extracting sugar from sugar-cane the cane is passed between powerful rollers, which effect an extraction of the greater part of the juice, and the cane is thus crushed and presents a dry fibrous substance constituting bagasse, which, as stated, retains from sixty-five to fifty pounds of sugar to the ton. In carrying out my process I take this crushed cane and pass it through a reduction-mill or pulverizer to reduce it to a meal or, if desired, to a fine powder, and this procedure effects thorough disintegration of every particle of the cellulose and frees the sugar contained in the interstices of the cellulose. I then soak the meal or powder in water, allowing the water to be absorbed by the meal, and thus present a mushy mass. This mass is then passed through a centrifugal drying-machine, which effects a separation of the water from the meal, the water in the meantime having absorbed all or practically all of the sugar and leaving the sugar-freed and approximately dry meal in the centrifugal machine. This same result can be obtained by passing the water through a series of gravity filters filled with the ground meal, the sweetened water being discharged at the bottom of the filters, or the water can be passed through ordinary diffusion-batteries; but for rapidity and effectiveness of operation I generally prefer a centrifugal machine for the purpose, for the reason that it is capable of being operated more rapidly and leaves the meal in a comparatively dry state after the sugar has been extracted. To obviate employing an unnecessary amount of water with the sugar, I utilize the water from the first centrifugal machine to wash a second, and the water from the second to wash a third, and so on, and continue this until the water has taken up as much sugar as possible, and then pass this sugar solution to evaporating-pans, where it is reduced and brought to a condition to be boiled down to sugar. The object in using the same water to wash a series of centrifugal machines is to concentrate the sugar into as small a volume of water as possible, and thereby save in fuel in boiling it down to sugar. For example, in an apparatus employing a series of, say, four centrifugals, all charged with comminuted bagasse, the water enters the first centrifugal and is retained therein until the bagasse is exhausted, or practically exhausted, of sugar. The bagasse is then discharged and a fresh charge supplied to this centrifugal. During this first step the sugar-charged water from the first centrifugal passes to a second centrifugal, this latter centrifugal practically taking the place of the first. When the bagasse in the second centrifugal is exhausted of sugar, the bagasse is discharged and a fresh charge is supplied thereto, the sugar-charged water passing to a third centrifugal, where the same operations are repeated, and then to a fourth centrifugal, where the same operations are again repeated, whence the sugar-charged water is discharged. The operation is thus continuous by reason of the fact that there is a constant supply of bagasse, and thus a constant flow of sugar-charged water from the centrifugals, so that the supply of bagasse being maintained there will be a steady discharge of sugar-charged water from the apparatus. The by-product or cane-meal after the sugar has been extracted may be utilized as a fertilizer, which increases its value many times over that which it has at present as a mere fuel. It is also further adapted for food for stock in the form of meal, and also for use as paper-stock.

In order to demonstrate one manner in which my invention may be carried into effect, I have illustrated herein diagrammatically an apparatus which will render an understanding of the operation clear, and in the accompanying drawing the figure is a view in the nature of a diagram displaying a machine for effecting separation of the sugar from the crushed meal.

In the drawing, A designates a reduction-mill, into which the crushed bagasse from the rolling-mills is fed. This reduction-mill may be of any preferred style, and therefore needs no further description.

Arranged below the reduction-mill and connected therewith by a discharge-pipe is a water-tight conveyer B, into which the meal is passed and is soaked to present a mushy mass, afterward to be subjected to suitable action to remove the sugar from the meal. This conveyer is provided at its bottom with a plurality of discharge-pipes $b$, having cut-offs $b^2$, and each opens into a centrifugal drier designated, respectively, C, D, E, and F. In the centrifugal C the cane-meal is washed with clear water. In the centrifugal D the mass is washed with sugar-water from the centrifugal C. In the centrifugal E the mass is washed with concentrated sugar-water from the centrifugals C and D, and in the centrifugal F the mass is washed with the concentrated sugar-water from the centrifugals C, D, and E, and so on. From the centrifugal F the concentrated sugar-water from the centrifugals C, D, E, and F is discharged through a pipe $f$ into a tank G. The centrifugals C, D, E, and F are connected by pipes $c$, $d$, and $e$, respectively, through which the sugar-water is passed from one to the other. The cane-meal from the centrifugals C, D, E, and F after the sugar-water is extracted is discharged into pipes $C^2$, $D^2$, $E^2$, and $F^2$, the entrance-mouths of which are normally closed by valves, (not shown,) thence into a conveyer or into conveyers H H$^2$, which may be steam-jacketed, if desired, where the meal can be thoroughly dried for certain commercial purposes, and from the conveyers the meal is discharged into a receptacle I.

As stated, the apparatus herein shown is merely diagrammatic in character and only demonstrates one way in which the process may be carried into effect, it being distinctly understood that I do not limit myself to any particular mechanism for carrying out my procedure.

To demonstrate the saving effected by my procedure of what would otherwise be a loss in sugar contained in certain quantities of bagasse, the following tables are presented, which are the results obtained by actual tests:

Average analysis of cane grown in Louisiana: One hundred pounds of cane equal ninety per cent. juice, ninety pounds, and ten per cent. bagasse, ten pounds. Average results from mills now in operation in Louisiana: One hundred pounds of cane equal extraction seventy-five per cent. juice, seventy-five pounds, and twenty-five per cent. bagasse, twenty-five pounds. My process begins with twenty-five pounds of bagasse equal sixty per cent. juice equal fifteen pounds, and forty per cent. fiber equal ten pounds. Fifteen pounds of juice contain twelve per cent. average sugar equal 1.8 pounds sugar. Allow for invisible loss twenty per cent. or, say, 1.44 pounds actual sugar. Ten pounds fiber meal at average four dollars per ton equal $.02. 1.44 pounds of sugar at net value three cents per pound equal $.0432. Total net value of each twenty-five pounds of bagasse, $.0632.

Comparison in tons: Average results from mills now operating in Louisiana: Two thousand pounds of cane equal extraction seventy-five per cent. equal fifteen hundred pounds juice, and twenty-five per cent. equal five hundred pounds bagasse. My process begins with five hundred pounds of bagasse equal sixty per cent. juice equal three hundred pounds, and forty per cent. fiber equal two hundred pounds; three hundred pounds of juice, twelve per cent. average sugar, thirty-six pounds minus 7.2 pounds invisible loss, equal 28.8 pounds net; two hundred pounds fiber at average price four dollars per ton; twenty-eight and four-fifths pounds sugar, net value three cents per pound, equal $.864; two hundred fiber-meal, one-tenth ton, at four dollars per ton, equal $.40; net value of each five hundred pounds of bagasse, $1.264. A mill crushing one thousand tons of cane per day will save by my process $1,264 per day. The entire crop of Louisiana equals three million tons. Three million tons at $1.264 per ton equals $3,792,000 saved by my process.

Having thus fully described my invention, what I claim as new, and desire to secure by Letters Patent, is—

The method of extracting sugar from bagasse, which consists in reducing the bagasse to a finely-divided state, dividing this into separate bulks or masses, supplying water to one of said masses, subjecting the water-charged mass to centrifugal action, supplying the solution thus obtained to another of said masses and subjecting this mass to centrifugal action, and repeating this throughout the separate bulks in progression, substantially as described.

In witness whereof I have hereunto affixed my signature in the presence of two subscribing witnesses.

ELMER B. WILLIAMS.

Witnesses:
 R. W. BIGGS,
 J. E. BONDURANT.